UNITED STATES PATENT OFFICE.

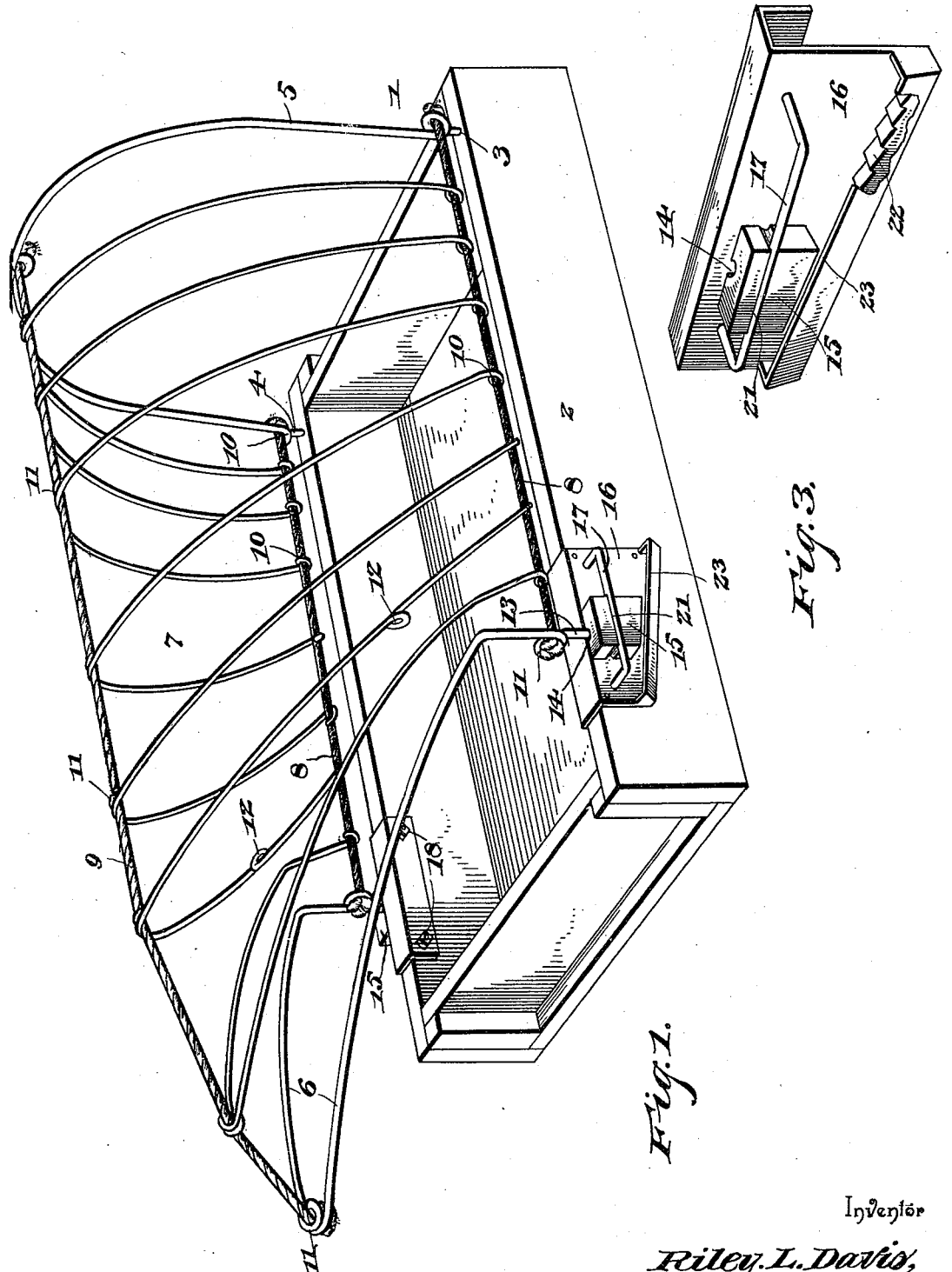

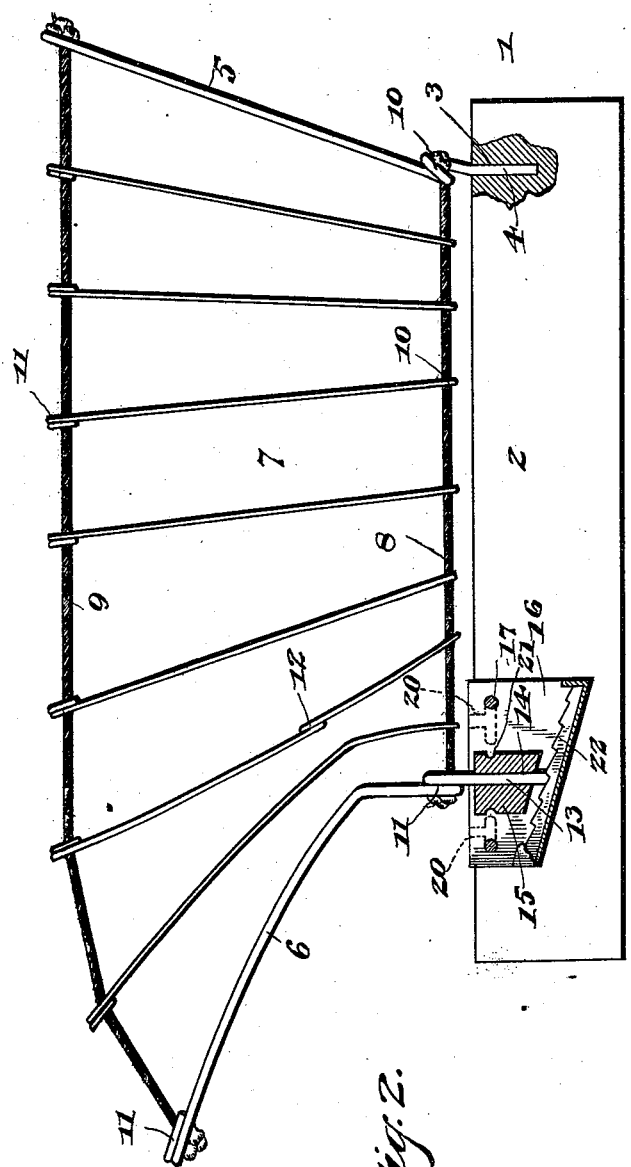

RILEY LENARD DAVIS, OF ASHEVILLE, NORTH CAROLINA, ASSIGNOR OF ONE-HALF TO JULIUS R. CAUBLE, OF SAME PLACE.

WAGON-TOP.

SPECIFICATION forming part of Letters Patent No. 510,330, dated December 5, 1893.

Application filed September 30, 1893. Serial No. 486,889. (No model.)

*To all whom it may concern:*

Be it known that I, RILEY LENARD DAVIS, a citizen of the United States, residing at Asheville, in the county of Buncombe and State of North Carolina, have invented a new and useful Wagon-Top, of which the following is a specification.

The invention relates to improvements in wagon tops.

The object of the present invention is to improve the construction of wagon tops, and to provide one which will be especially adapted for farm wagons and similar vehicles, and which may be readily detached from and replaced on a wagon bed and quickly adjusted to maintain the canvas or other covering at the desired tension.

The invention consists in the construction and novel combination and arrangement of parts hereinafter fully described, illustrated in the accompanying drawings and pointed out in the claims hereto appended.

In the drawings—Figure 1 is a perspective view of a portion of a vehicle having a wagon top constructed in accordance with this invention, the cover being removed. Fig. 2 is a side elevation partly in section. Fig. 3 is a detail perspective view of one of the adjustable sockets and its rack plate. Fig. 4 is a detail sectional view illustrating the manner of securing the ratchet plates to the wagon body.

Like numerals of reference indicate corresponding parts in all the figures of the drawings.

1 designates a wagon body, provided at the rear ends of its sides 2, at the upper edges thereof, with sockets 3 receiving shanks 4 of a rear bow of a wagon top frame, which is composed of the said rear bow 5, a front bow 6 and a series of intermediate bows 7, which are all connected collapsibly by lower side ropes or cords 8, and by a ridge rope or cord 9. The cords, or ropes, or equivalent connections are passed through eyes 10 and 11 of the bows, which may be of any desired construction; and the front bow is bent forwardly as shown to give the proper length to the wagon top, and to leave room at the sides of the wagon body to enter and leave the same.

One of the bows, near the front of the top, is provided at each side with an additional eye 12 to facilitate the attachment of a cover (not shown), which may be of any suitable construction.

The shanks 4 of the rear bow 5 are detachably stepped in the sockets 3; and the shanks 13 of the front bow are arranged detachably in sockets 14 of adjustable blocks 15, which are mounted on rack plates 16 in keepers 17 thereof. The rack plate 16 has its upper portion bent angularly and extended over the upper edge and down the inner face of the adjacent side of the wagon body; and the keeper 17 is rectangular, and is provided with threaded shanks having securing nuts 18 and arranged in horizontal slots 19 of the sides of the wagon body or bed. The slots 19 are provided with entrance openings or mouths 20, and the plates 16 may be adjusted on the sides of the wagon body and can be secured at any adjustment by the nuts 18.

The block 15 is slidingly mounted on the plate, and is provided with a groove 21 to receive the keeper; and it is secured in its adjustment by the shank of the front bow which it receives, and which has its lower end beveled and engaging an inclined series of teeth 22 arranged at the bottom of the plate 16. The plate 16 is provided around the outer sides and ends of the series of teeth with an upward extending flange 23 to prevent any liability of the shanks becoming accidentally disengaged from the rack.

It will be seen that the wagon top is simple, inexpensive, strong and durable, that it enables a wagon top to be quickly placed on and removed from a wagon bed or body, and that it is capable of readily tightening its parts to the desired extent.

The plates may if desired be permanently secured to the wagon bed, which can be readily accomplished by providing perforations for the shanks of the keepers, instead of slots.

Changes in the form, proportion, and the minor details of construction may be resorted to without departing from the principle or sacrificing any of the advantages of this invention.

What I claim is—

1. The combination of a wagon body provided with sockets, of a wagon top frame composed of end bows having shanks arranged in the sockets and provided at their tops and sides with eyes, intermediate bows provided at their tops and sides with eyes, and a ridge and side ropes arranged in the eyes and connecting the bows, substantially as described.

2. The combination of a wagon body, a plate secured to the same and arranged on one side thereof and provided with a series of teeth arranged longitudinally of the body, a movable block mounted on the plate and having a socket, and a bow having a shank arranged in the socket and engaging the teeth of the plate, substantially as described.

3. The combination of a wagon body, a plate secured to one side thereof and having a ratchet arranged longitudinally of the body, and a bow movably mounted on the plate and engaging the ratchet, substantially as described.

4. The combination of a wagon body, a plate secured thereto and provided with a ratchet arranged longitudinally of the body, a horizontal keeper extending outward from the plate, a block slidingly mounted on the plate and secured thereto by the keeper and provided with a socket, and a bow having a shank arranged in the socket and engaging the ratchet, substantially as described.

5. The combination with a wagon body and a bow having a shank, of a plate secured to the body and provided at its bottom with a longitudinally disposed inclined series of teeth and having an upward projecting flange arranged around the ends and outer side of the series of teeth, a horizontal keeper extending from the plate and arranged above the teeth, and a sliding block mounted on the keeper and arranged within the same and having a socket to receive the shank of the bow, substantially as described.

6. The combination of a wagon body provided with horizontal slots having entrances adjacent to the top of its side, a plate provided at its bottom with a ratchet and having its upper edge hooked over the side of the body, a keeper extending from the plate and provided with shanks arranged in the slots and provided with nuts, and a block slidingly mounted in the keeper and provided with a socket, substantially as described.

7. The combination of a plate having its upper edge angularly bent and adapted to be hooked over the upper edge of a side of a wagon body, said plate being provided at its lower edge with an inclined series of teeth and having an upwardly extending flange surrounding the teeth, a horizontal keeper provided with threaded shanks extending through the plate and arranged above the teeth and having nuts, and a block arranged within the keeper and having a groove receiving the same and provided with a socket adapted to receive a shank of a bow, substantially as described.

In testimony that I claim the foregoing as my own I have hereto affixed my signature in the presence of two witnesses.

RILEY LENARD DAVIS.

Witnesses:
JULIUS C. MARTIN,
MARCUS ERWIN.